May 25, 1926.

C. V. PERRY

END FITTING

Filed June 4, 1924

1,585,688

Inventor,
Charles V. Perry,
By Horatio E. Bellows
Attorney

Patented May 25, 1926.

1,585,688

UNITED STATES PATENT OFFICE.

CHARLES V. PERRY, OF WEST HAVEN, CONNECTICUT, ASSIGNOR OF ONE-HALF TO LEONARD P. BOSWORTH, OF BARRINGTON, RHODE ISLAND.

END FITTING.

Application filed June 4, 1924. Serial No. 717,727.

My invention relates to end fittings for electrical conduits or cables in distinction from pipe fittings.

The essential objects of my invention, in addition to the ends commonly sought, are to enable the use of the fitting upon a flexible cable or the like without requiring the usual threaded connector; to insure a firm engagement of the fitting with the cable; to prevent injury to wire insulation during installation; and to attain these ends in a simple and inexpensive structure.

To the enumerated ends essentially my invention consists in such parts and in such combinations of parts as fall within the scope of the appended claim.

In the accompanying drawings which form a part of this specification

Figure 1:
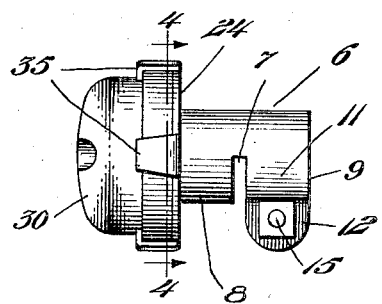
Figure 2:
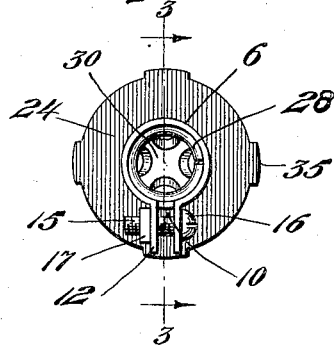
Figure 3:
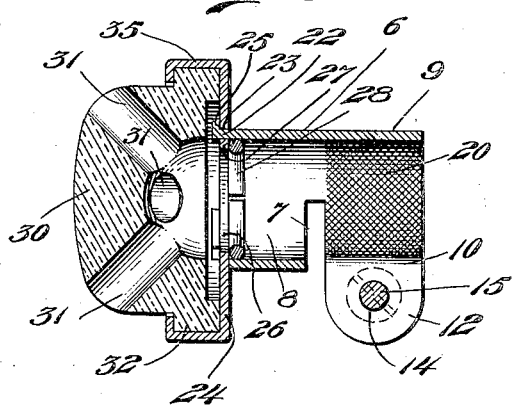
Figure 4:
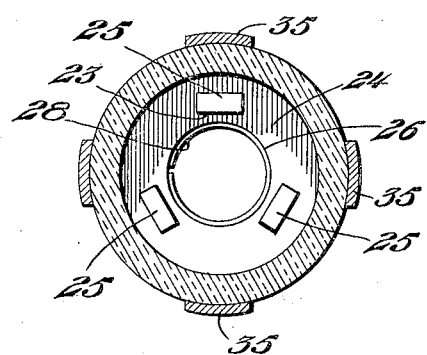
Figure 5:
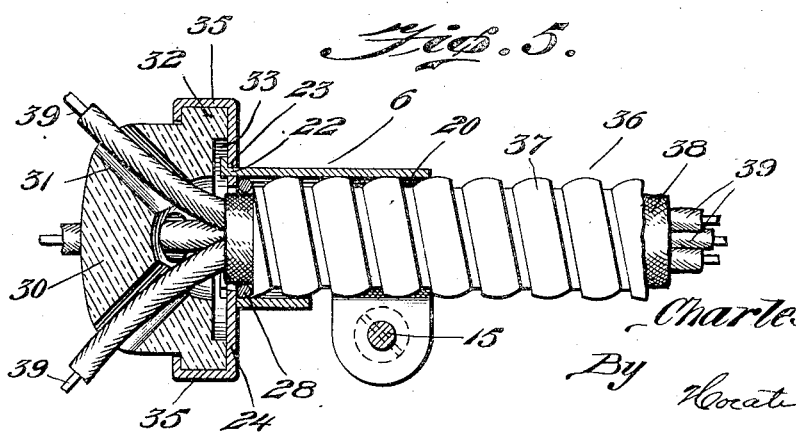

Figures 1 and 2 are a side and a rear elevation respectively of an end fitting embodying my invention, Figures 3 and 4, a section on line 3—3 of Figure 2, and a section on line 4—4 of Figure 1 respectively, and Figure 5, a section of the fitting engaged with the end of a cable taken on a line 3—3 of Figure 2, and showing the cable in side elevation.

In detail my fitting comprises a thin metallic sleeve 6 having an intermediate transverse slot 7 forming a shank portion 8 and an end portion 9, the latter being longitudinally split as at 10 to form a clamping portion having upon its resilient sections 11 parallel projecting ears 12 provided with perforations 14 adapted to receive a clamping screw 15 whose head 16 engages one ear, while a nut 17 thereon engages the other ear. The interior of the clamping portion 9 of the sleeve is provided with knurls 20 or is otherwise roughened. Lugs 22 on the inner end of the sleeve pass through slots 23 in a plate 24 and terminate in bent ends 25 clamping the latter. The slots are radially disposed around a central circular hole 26 in the plate 24. The hole 26 is of less diameter than the sleeve 6 so that there results an integral inwardly directed flange 27 against which abuts a spring guard ring 28 frictionally engaging the sleeve and serving as a grip for the wires and prevents contact of the insulation with the flange 27, said ring being of greater diameter than the opening through said flange, as seen in Figure 3. The transversely rounded inner periphery of the ring is of less diameter than the hole 26. An insulating head 30 has usual openings 31 and is provided with a lateral peripheral shoulder 32 at its base and has a circular recess 33 in the latter. The head 30 rests on the plate 24 and the shoulder 32 is loosely overlapped by fingers 35 integral with the periphery of the plate.

In Figure 5 is shown a cable or conduit 36 comprising the usual ribbed sheath 37 surrounding the insulation 38 and wires 39. The conduit is clamped by the screw 15 and the resilient sections 11 within the sleeve 8, the knurls 20 assisting in retaining the cable against longitudinal movement in one direction and the flange 27 in the other direction. The ring 28 when present not only guides the wires but protects the insulation from contact with the flange 27. When said ring is absent the flange 27 affords an abutment for the end of the sheath 37.

I claim:—

In an end fitting for cables, a sleeve comprising a shank portion and a longitudinally split clamp portion, a head plate provided with a central opening fixed to the end of the shank portion and forming an internal annular flange, a resilient split guard ring frictionally mounted in the shank portion and abutting against the flange, and an insulating head attached to the plate.

In testimony whereof I have affixed my signature.

CHARLES V. PERRY.